March 7, 1944.  D. PINNELLI  2,343,474
AUTOMATIC SAFETY STOP
Filed Aug. 7, 1942  2 Sheets-Sheet 1
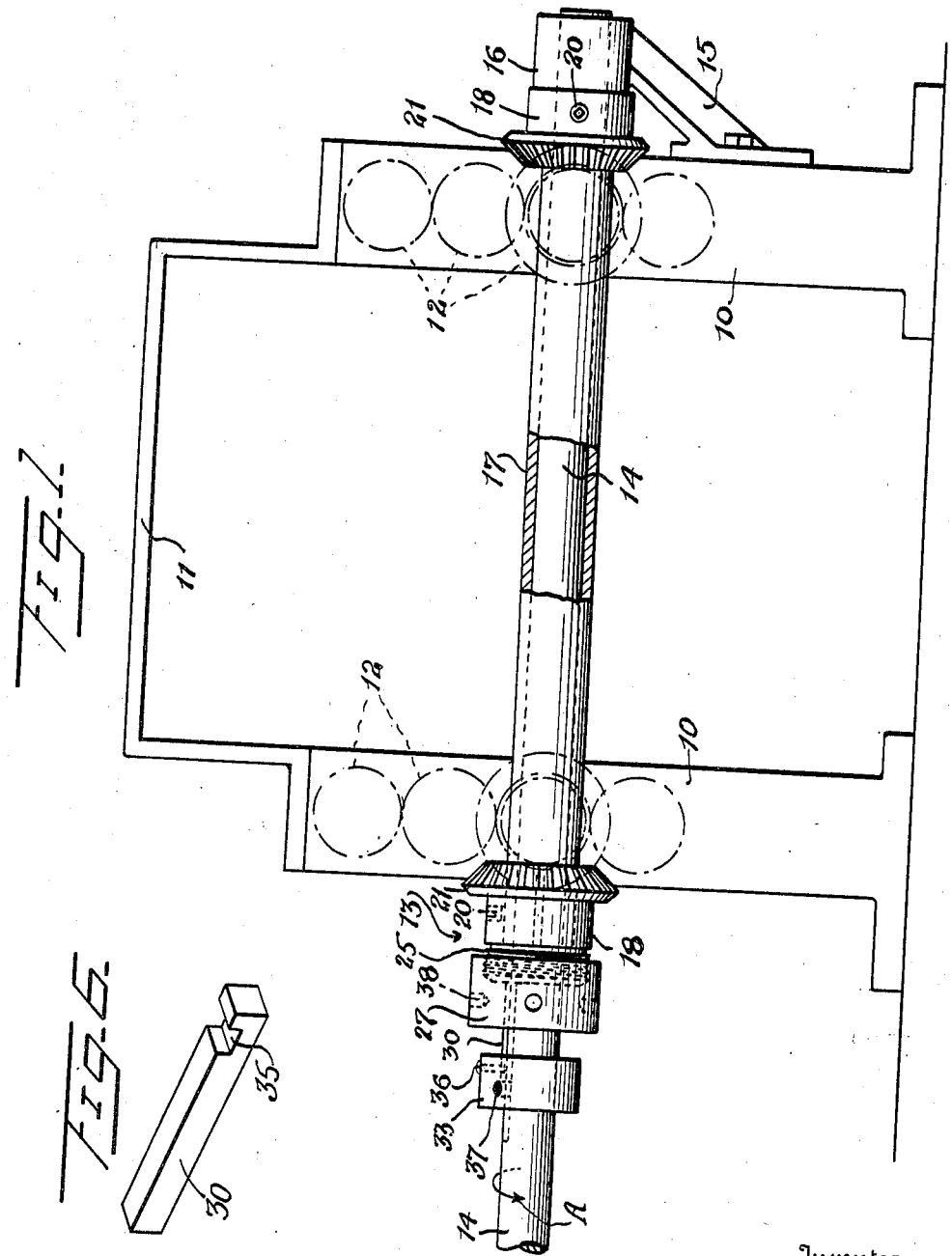
Inventor
Donato Pinnelli
By Bryant K Lowry
Attorneys

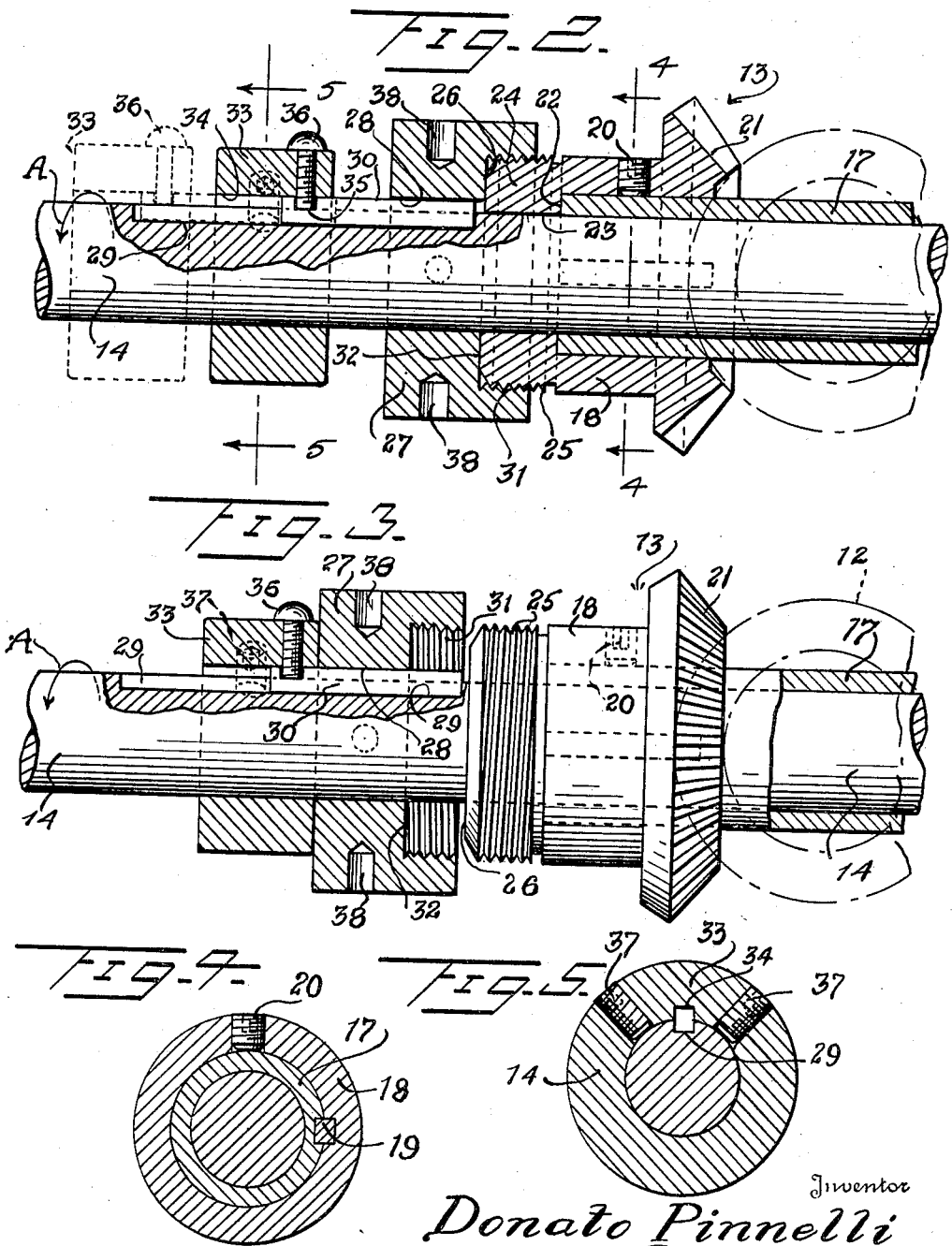

Patented Mar. 7, 1944

2,343,474

UNITED STATES PATENT OFFICE 2,343,474

AUTOMATIC SAFETY STOP

Donato Pinnelli, Orange, N. J.

Application August 7, 1942, Serial No. 454,029

7 Claims. (Cl. 192—56)

This invention relates to certain new and useful improvements in automatic safety stops.

The primary object of the invention is to provide an automatic safety stop in the form of a friction clutch for use in drive mechanisms and one in which an overload upon a driven device will automatically disconnect a driving device from the driven device, with the driving device continuing in its motion while the driven device stands idle and thereby eliminate damage to the driven device.

A further object of the invention is to provide an automatic safety stop for a driven member wherein a friction clutch of a drive element comprising a rotated member has threaded engagement with a member of the driven element with unthreading movement between the two members being in the direction of rotation of the drive element so that overload or stoppage of the driven element permits unthreading action of the drive member of the clutch relative thereto for the disconnection of the drive member from the driven element.

With the above and other objects in view that will become apparent as the nature of the invention is better understood, the same consists in the novel form, combination and arrangement of parts hereinafter more fully described, shown in the accompanying drawings and claimed.

In the accompanying drawings:

Figure 1 is a fragmentary side elevational view, partly in section, showing the automatic safety stop associated with an intersecting gill head of a drawing machine and with the clutch members of the device threadedly engaged with each other, Figure 2 is a fragmentary longitudinal sectional view showing the drive and driven elements, the friction clutch therebetween with a stop member for the drive element of the clutch shown by dotted lines in a shifted position for disconnecting the drive element of the clutch from the drive shaft, the drive elements of the clutch being illustrated as engaged with each other, Figure 3 is a fragmentary longitudinal sectional view, similar to Figure 2, showing the clutch members of the safety stop separated, Figure 4 is a cross-sectional view taken on line 4—4 of Figure 2, Figure 5 is a cross-sectional view taken on line 5—5 of Figure 2, and Figure 6 is a perspective view of the shiftable key carried by the stop collar for controlling operation of the clutch collar.

For purposes of illustration only, the automatic safety stop has been shown in connection with an intersecting gill head of a drawing machine embodying comb elements for straightening hemp or other fibers and it is to be understood that this automatic safety stop or clutch may be employed in various arts wherein the weight of the driven load is not excessive and wherein the presence of an overload is operative to immediately disconnect the clutch elements of the safety stop and bringing the driven mechanism to rest and permitting continuous operation of the drive mechanism.

As briefly illustrated in Figure 1, an intersecting gill head for a drawing machine is shown as comprising side standards 10 connected by a cross head 11 and between which the usual gill head combs mounted upon a driven member are disposed. As illustrated by dotted lines in Figure 1, the intersecting gill head comprises a gear train 12 adjacent each standard 10 that are in mesh with a drive gear designated in general by the reference character 13 that forms a part of the drive mechanism for the gear trains 12.

It is to be understood that a battery of such machines as briefly described may be set up and a single longitudinally extending drive shaft 14 is provided therefor, a bracket support 15 with a bearing 16 for one end of the shaft being supported on one of the frame standards 10 as shown in Figure 1. Other supports for the drive shaft 14 are provided at suitably spaced points in the battery of machines. A sleeve 17 is freely rotatable on the drive shaft 14 and is of a length to have its ends extend over the gear trains 12 with a drive gear 13 of the automatic safety stop mechanism secured to each end thereof.

As shown more clearly in Figures 2 and 4 the drive gear 13 comprises a cylindrical bearing 18 that is keyed as at 19 to the sleeve 17 and to restrain the drive gear 13 from longitudinal movement relative to the sleeve, said drive gear is anchored in position by the radial set screw 20 passing through the cylindrical bearing 18 for engagement with the sleeve 17. One end of the bearing sleeve 18 is provided with a bevel gear 21 that meshes with an adjacent bevel gear of the adjacent gear train 12. The other end of the bearing sleeve 18 has the bore thereof reduced in diameter to provide an abutment shoulder 22 for engaging the adjacent end of the sleeve 17 and a bearing face 23 freely riding upon the drive shaft 14. The end 24 of the bearing sleeve 18 is provided on its outer side with a left-hand screw thread 25 and the end terminal face of the end 24 of the bearing 18 constitutes a friction clutch face 26. It will be observed that the sleeve 17 and drive gear 13 secured thereto are in constant mesh with the gear train 12 and are capable of movement independently of the drive shaft 14.

A clutch collar and a slide collar are keyed to the drive shaft 14, the clutch collar cooperating with the drive gear 13 for the operation of the gear trains 12 and as shown more clearly in Figures 2, 3, 5 and 6, the clutch collar 27 is mounted on the drive shaft 14 adjacent the end 24 of the drive gear 13, the bore in the clutch collar having a key slot 28 for registry with the key slot 29 in the drive shaft and to be splined on said shaft by means of the interfitting key 30. The side of the clutch collar 27 facing the end 24 of the drive gear 13 is recessed to provide an annular socket, the outer annular wall of which is provided with a left-hand thread 31 mating the thread 25 upon the drive gear while the bottom face 32 of the end socket in the clutch collar forms a friction clutch face cooperating with the terminal and clutch face 26 on the drive gear 13.

An abutment slide collar is mounted on the drive shaft 14 for the clutch collar 27, the slide collar 33 as shown in Figures 2, 3 and 5 having a key slot 34 in the bore thereof registering with the key slot 29 in the drive shaft 14 with the adjacent end of the key 30 securing the slide collar to the drive shaft 14 for rotation therewith. As shown in Figures 2, 3 and 6 the end of the key 30 that extends into the collar key slot 34 has a notch 35 therein that receives the stud screw 36 to form an interfitting connection between the slide collar 33 and the key 30. The slide collar 33 is retained in its adjusted position longitudinally of the drive shaft 14 by means of a pair of stud screws 37 radially passing therethrough for engagement with the drive shaft as shown in Figure 5. From an inspection of Figures 2 and 3 it will be observed that the key slot 29 in the drive shaft 14 extends a distance beyond the normal position of the slide collar 33.

In the normal position of the automatic safety stop comprising the principal elements, namely, the clutch collar 27 and the drive gear 13, the clutch collar is threaded onto the drive gear and by the use of a spanner wrench having lugs entering the radial openings 38 in the clutch collar, these elements are firmly united, the clutch faces 26 and 32 engaging each other as well as the faces of the threads 25 and 31. Also, in the normal position of these coupled elements of the automatic safety stop, the clutch collar 27 is spaced from the slide collar 33. The shaft 14 rotates in the direction of the arrow A which is in a direction tending to unthread the clutch collar from the drive gear, but the frictional engagement between the clutch faces of the clutch collar and drive gear is stronger than the resistance offered by the gear trains 12 and the elements driven thereby. Should the elements driven by the gear trains or the spur gears of the trains jam in any way, the overload offered thereby would be greater than the power of the frictional contact between the clutch collar and drive gear which would result in immediate stoppage of rotation of the sleeve 17 carrying the drive gear 13 and in association with the gear trains 12 and cause the clutch collar to unthread from the drive gear by the continued rotation thereof with the shaft 14, the splined key connection between the clutch collar and drive gear permitting sliding movement of the clutch collar longitudinally of the drive shaft for displacement laterally of the drive gear 13 to assume the disconnected position shown in Figure 3 and to be abuttingly engaged with the adjustably fixed slide collar 33. The drive shaft 14 continues in its operation for the operation of the other machines of the battery and only the disconnected machine is out of operation for repair purposes. When it is desired to place the damaged machine back into operation, the drive shaft 14 for the battery of machines is brought to rest, the slide collar 33 released by the stud screws 37 from its connection with the drive shaft 14 and is shifted to its dotted line position shown in Figure 2 to carry therewith the key 30 and to free the clutch collar 27 relative to said key and driven shaft. The clutch collar is then moved toward the drive gear and upon rotation of the driven mechanism and gear trains 12, the sleeve carrying the drive gear 13 is likewise rotated so that by holding the clutch collar against rotation by means of a spanner wrench, the clutch collar is moved into threaded engagement with the drive gear with the clutch faces 26 and 32 again intimately engaged. The slide collar 33 is then returned to its normal operating position as illustrated by full lines in Figure 2 and moves the key 30 into the cooperating keyways 28 and 29 of the clutch collar and drive shaft for locking the clutch collar to the drive shaft.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:

1. In a safety stop of the character described, a drive shaft, a sleeve journaled thereon, cooperating clutch elements respectively carried by the sleeve and shaft, driven mechanism in constant association with the clutch element on the sleeve, a threaded connection between the clutch elements having the direction of threads for the separating movements thereof in the direction of rotation of the drive shaft, and an abutment member adjustably mounted on the drive shaft and having means movable therewith for connecting and disconnecting one of the clutch elements relative to the drive shaft.

2. In a safety stop of the character described, a drive shaft, a sleeve journaled thereon, cooperating clutch elements respectively carried by the sleeve and shaft, driven mechanism in constant association with the clutch element on the sleeve, a threaded connection between the clutch elements having the direction of threads for the separating movements thereof in the direction of rotation of the drive shaft, an abutment slide collar on the shaft outwardly of the clutch element carried thereby and means attached to said slide collar and movable therewith for keying the last named clutch element to the shaft, said means being rendered inoperable upon outward shifting movement of the abutment slide collar.

3. In a safety stop of the character described, a drive shaft, a sleeve journaled thereon, cooperating clutch elements respectively carried by the sleeve and shaft, driven mechanism in constant association with the clutch element on the sleeve, a threaded connection between the clutch elements having the direction of threads for the separating movements thereof in the direction of rotation of the drive shaft, the threaded connection between the clutch elements including an internally threaded recess on one element with a flat friction face at the bottom of the recess and an external thread on the other clutch element with the end thereof having a flat friction face.

4. In a safety stop of the character described, a drive shaft, a sleeve journaled thereon, cooperating clutch elements respectively carried by the sleeve and shaft, driven mechanism in constant association with the clutch element on the sleeve, a threaded connection between the clutch elements having the direction of threads for the separating movements thereof in the direction of rotation of the drive shaft, an abutment slide collar on the shaft outwardly of the clutch element carried thereby and means attached to said slide collar and movable therewith for keying the last named clutch element to the shaft, said means being rendered inoperable upon outward shifting movement of the abutment slide collar, the threaded connection between the clutch elements including an internally threaded recess on one element with a flat friction face at the bottom of the recess and an external thread on the other clutch element with the end thereof having a flat friction face.

5. In a safety stop of the character described, a drive shaft, a sleeve journaled thereon, cooperating clutch elements respectively carried by the sleeve and shaft, driven mechanism in constant association with the clutch element on the sleeve, a threaded connection between the clutch elements having the direction of threads for the separating movements thereof in the direction of rotation of the drive shaft, an abutment slide collar on the shaft outwardly of the clutch element thereon, a spline key on the shaft having an interlocking connection with the slide collar and said key forming a spline connection between the clutch element on the sleeve and the shaft and movable with the abutment collar for displacement relative to the last named clutch element.

6. In a safety stop of the character described, drive and driven elements, clutch devices respectively carried by said elements and secured thereto, a threaded connection between the clutch elements having unthreading movements thereof in the direction of rotation of the drive element, and means comprising a displaceable spline for disconnecting the clutch device carried by the drive element therefrom for rendering the clutch devices inoperative during rotation of the drive element.

7. In a safety stop of the character described, drive and driven elements, clutch devices respectively carried by said elements and secured thereto, a threaded connection between the clutch elements having unthreading movements thereof in the direction of rotation of the drive element, and means for disconnecting the clutch device carried by the drive element therefrom for rendering the clutch devices inoperative during rotation of the drive element, said means including a slide collar on the drive element and a spline key interlocked and slidable therewith with the key engageable and disengageable with its associated clutch device.

DONATO PINNELLI.